(12) United States Patent
Andresen et al.

(10) Patent No.: US 7,346,154 B1
(45) Date of Patent: Mar. 18, 2008

(54) CUSTOMIZING PREPAID SERVICE

(75) Inventors: Lars Andresen, Hellerup (DK); Michael Andersen, Lyngby (DK)

(73) Assignee: Nokia Corporation, Espoo (FI)

( * ) Notice: Subject to any disclaimer, the term of this patent is extended or adjusted under 35 U.S.C. 154(b) by 247 days.

(21) Appl. No.: 10/069,485

(22) PCT Filed: Sep. 1, 2000

(86) PCT No.: PCT/FI00/00741

§ 371 (c)(1),
(2), (4) Date: May 29, 2002

(87) PCT Pub. No.: WO01/19068

PCT Pub. Date: Mar. 15, 2001

(30) Foreign Application Priority Data

Sep. 2, 1999 (FI) .................................. 19991873

(51) Int. Cl.
*H04M 15/00* (2006.01)
(52) U.S. Cl. .............................. 379/114.16; 379/114.2
(58) Field of Classification Search ............ 379/114.2, 379/114.01, 114.15, 114.17, 114.16, 114.28, 379/121.03, 144.01, 114.03, 131; 455/405, 455/406, 407, 408, 432.3
See application file for complete search history.

(56) References Cited

U.S. PATENT DOCUMENTS

| | | | |
|---|---|---|---|
| 5,408,519 A * | 4/1995 | Pierce et al. | 379/88.17 |
| 5,592,535 A | 1/1997 | Klotz | |
| 5,677,945 A | 10/1997 | Mullins | |
| 5,844,972 A | 12/1998 | Jagadish et al. | |
| 5,909,485 A * | 6/1999 | Martin et al. | 379/114.2 |
| 5,991,380 A | 11/1999 | Bruno et al. | |
| 6,085,179 A | 7/2000 | Halm | |
| 6,404,869 B1 * | 6/2002 | Henderson et al. | 379/144.01 |
| 6,618,583 B1 | 9/2003 | Ergezinger | |
| 6,704,563 B1 * | 3/2004 | Senn et al. | 455/406 |

FOREIGN PATENT DOCUMENTS

| | | |
|---|---|---|
| AU | 199943506 A1 | 2/2001 |
| EP | 860 975 | 8/1998 |

(Continued)

OTHER PUBLICATIONS

Pamplet—E-Plus: '98 Tariffs: E-Pllus makes it easy for you, May 1998.*

(Continued)

*Primary Examiner*—Barry Taylor
(74) *Attorney, Agent, or Firm*—Pillsbury Winthrop Shaw Pittman LLP

(57) ABSTRACT

A method for customizing a prepaid service in a telecommunications system is presented. The method includes maintaining subscriber information on at least one prepaid subscriber, defining at least two different prepaid profiles, each prepaid profile defining at least one attribute for the prepaid service, the attribute indicating how the prepaid service is to be provided; associating the prepaid subscriber's subscriber information with one of the at least two different prepaid profiles, and providing the prepaid service to the prepaid subscriber as indicated by the attribute defined in the one prepaid profile associated with the prepaid subscriber's information. In other embodiments, there are provided a telecommunication system offering prepaid subscription services and a network element in a telecommunication system.

19 Claims, 2 Drawing Sheets

| | | Gold | Silver | Economy |
|---|---|---|---|---|
| DF | Bonus | 0,1 | 0 | 0 |
| | X1 | 1 | 1 | 1 |
| | X2 | 1 | 1 | 0,9 |
| | X3 | 1 | 0,5 | 0 |
| | X4 | 1 | 0,4 | 0 |
| | X5 | 1 | 0 | 0 |
| | Max Acc | None | None | 500 |
| EF | A | Later than old or current | Old | Current |
| | T3 | 365 | 1 | 0 |
| | DT2 | -335 | -30 | -15 |
| | DT4 | -335 | 150 | 45 |
| | DT5 | -365 | 180 | 65 |
| | Max time | None | None | 30 |

FOREIGN PATENT DOCUMENTS

| | | |
|---|---|---|
| GB | 2 313 744 A | 12/1997 |
| GB | 2 322 771 A | 9/1998 |
| JP | 09 312 708 A | 12/1997 |
| WO | WO 99/14933 | 3/1999 |
| WO | WO 99/18713 | 4/1999 |
| WO | WO 99/27723 | 6/1999 |
| WO | WO 99/30480 | 6/1999 |
| WO | WO 99/38313 | 7/1999 |
| WO | WO 99/60771 | 11/1999 |

OTHER PUBLICATIONS

Press Release, "Got a Digital Phone? AIPtm into pre-paid mobile calls," Telstra MobileNet home page, http://mobilenet.telstra.com.au, 2 pp. ( Nov. 19, 1997).

TELSTRA, "Document associated with Telstra's ZIP prepaid services, entitled 'Zip User Guide'," 22 pp.

TELSTRA, "Brochure associated with Telstra's Zip prepaid services," 2 pp.

TELSTRA, "Brochure associated with Telstra's U prepaid service," 6 pp.

Peter Brownbridge, Services Group, "Generic Pre-Paid Services Definition," Aethos Communication Systems Ltd., 46 pp. ( Jun. 5, 1998).

Aethos Communication Systems Ltd, "Aethos fsdlact User Guide: Service Node," 28 pp. ( Jun. 17, 1998).

Aethos Communication Systems Ltd, "Aethos—Generic Database Description—Service Node," 80 pp. ( May 18, 1998).

Andy Phelps, Originator, "Logica Aldiscon—Service Node—Generic Credit Action Library," 52 pp. ( Aug. 5, 1999).

Aethos Communication Systems Ltd, "Aethos—Tariff GUI User Guide—Service Node," 96 pp. ( Jul. 17, 1998).

Baskerville Communications Corporation, "Global Mobile Prepaid Strategies," 49 pp. ( Jul. 1998).

Aethos Communication Systems, "Aethos—Service Node—System Overview—Wireless Prepayment," 13 pp. ( Mar. 1998).

Tony Richardson, "Aethos Communication Systems—Release specification for Service Node Release 2.3.2 (Draft)," Aethos Communication Systems, 16 pp.

"Billing for Mobile Services," Digital Cellular Report, Phillips Business Information, vol. 4 ( No. 17), 2 pp.

Magedanz, Thomas and Radu Popescu-Zeletin, "Intelligent Networks," International Thomson Computer Press, 143 pp. ( 1996).

Harju, Jarmo, Tapani Karttunen and Olli Martikainen, Editors, "Intelligent Networks, Proceedings of the IFIP workshop in intelligent networks," pp. 1-33, 61-67, 159-193 ( 1994).

IEEE Communications Magazine, vol. 31 ( No. 3), 47 pp. ( Mar. 1993).

BT Technology Journal, vol. 13 ( No. 2), 155 pp. ( Apr. 1995).

International Telecommunuication Union, "ITU-T Recommendation Q.1219, Intelligent Network User's Guide for Capability Set 1, Sections 1-5 and Appendix A3," ITUT-T, Telecommunications Standardization Sector, 30 pp. ( Apr. 1994).

"Cell Phone of Docomo Having Functions Corresponding the 'Pre-Call' service and 'Voice Search' Function," Mobile Media Magazine, vol. 7 ( No. 8), p. 46, (Jul. 13, 1999).

Pamphlet—E-Plus: Tarife '98 E-Plus macht's Ihnen leicht, (May 1998).

Magedanz, Thomas and Radu Popescu-Zeletin, "Intelligent Networks," International Thomson Computer Press, 214 pp. ( Dec. 1996).

Harju, Jarmo, Tapani Karttunen and Olli Martikainen, Editors, "Intelligent Networks, Proceedings of the IFIP workshop in intelligent networks," pp. 1-33, 61-67, 159-193 ( Dec. 1994).

* cited by examiner

| | Gold | Silver | Economy |
|---|---|---|---|
| Bonus | 0,1 | 0 | 0 |
| X1 | 1 | 1 | 1 |
| X2 | 1 | 1 | 0,9 |
| X3 | 1 | 0,5 | 0 |
| X4 | 1 | 0,4 | 0 |
| X5 | 1 | 0 | 0 |
| Max Acc | None | None | 500 |
| A | Later than old or current | Old | Current |
| T3 | 365 | 1 | 0 |
| DT2 | -335 | -30 | -15 |
| DT4 | -335 | 150 | 45 |
| DT5 | -365 | 180 | 65 |
| Max time | None | None | 30 | ated with the service. In associa-
CUSTOMIZING PREPAID SERVICE

BACKGROUND OF THE INVENTION

The present invention relates to a method and equipment for customizing prepaid service.

In telecommunications systems, such as the pan-European digital mobile communications system GSM (Global System for Mobile Communications), the use of prepaid SIM (Subscriber Identity Module) cards is increasing. Prepaid SIM cards relieve the network service providers of credit losses. They enable parents to set an upper limit for the telephone bill beforehand. As a third benefit, they enable roaming subscribers to pay their local calls with local tariffs, whereas the use of a SIM card of their home service provider results in paying international tariffs to their home network and back.

Usually service providers allow the subscribers to call an Interactive Voice Response (IVR) service through which the service subscribers can check their account balance and add more money to their accounts. This money adding is called recharge. Instead of calling the IVR it is possible to also call to the operator's service number. It is also possible to check the account balance and recharge via the SMAP, which is an Internet-based user interface. Recharge is carried out by means of vouchers. Some service providers sell different types of vouchers, which differ from each other e.g. in the number of call units and expiry time.

One problem with the current prepaid solution is that the attributes of the prepaid service are the same to all subscribers—or at least to all subscribers using the same kinds of vouchers since the attributes are connected with the voucher. So the operators are not able to offer a customized prepaid service. One example of a prepaid service attribute is how the prepaid subscription data is updated during recharge.

DISCLOSURE OF THE INVENTION

The object of the invention is to overcome the above problem. The object of the invention is achieved with a method, a system and a network element which are characterized in that what disclosed in the independent claims. The preferred embodiments of the invention are set forth in the dependent claims.

The invention is based on defining different subscriber profiles having different attributes and associating subscriber information with an indication of which profile to use with this subscriber.

The advantages of the invention are that the service providers can customize their prepaid service without changing the basic service structure by giving different profiles to the subscribers. Thus customizing and changing customized services are very easy.

In one embodiment of the invention the attribute is a deposit function. A further advantage of this embodiment is that other features than the voucher value may also be taken into account when calculating a new credit.

In still another embodiment of the invention the attribute is an expiry function. The further advantage of this embodiment is that other features than the voucher validity time may also be taken into account when calculating new expiry dates.

BRIEF DESCRIPTION OF THE FIGURES

The invention will be described in further detail in the following by means of preferred embodiments with reference to the accompanying drawings, in which.

DETAILED DESCRIPTION OF THE INVENTION

Figures 1, 2:
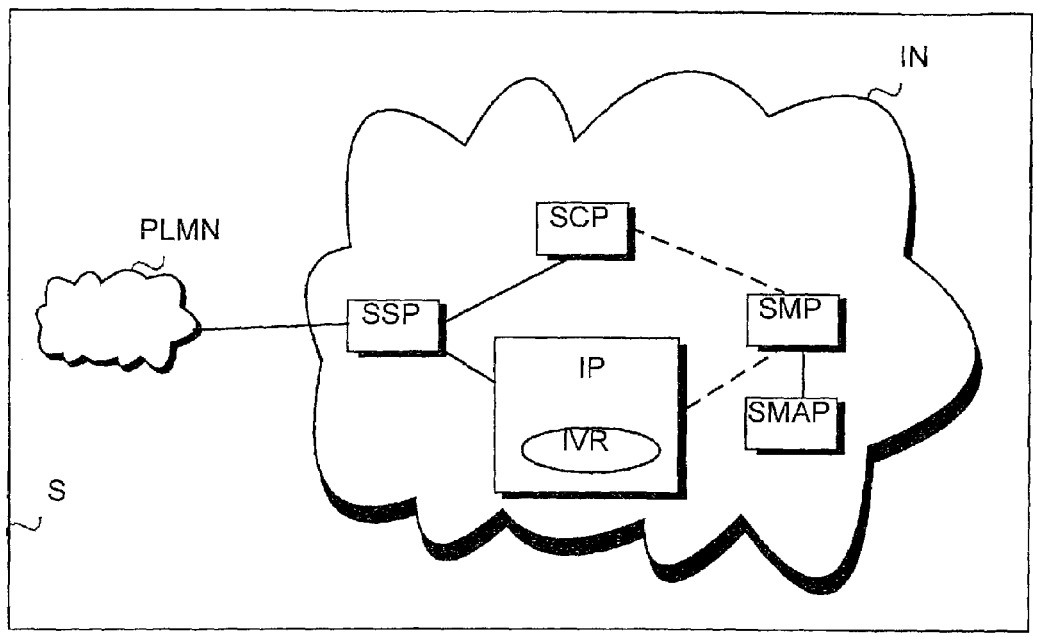
FIG. 1 is a block diagram showing some relevant network elements.
FIG. 2 is a block diagram illustrating different profiles according to a first preferred embodiment.

FIG. 1 is a block diagram of a telecommunications system S equipped with an arrangement according to a preferred embodiment of the invention. The telecommunications network is assumed to be a public land mobile network PLMN yet without limiting the invention to that kind of particular network. The invention can be used in any telecommunications systems, where prepaid subscribers have subscription information stored in the system. A prepaid subscriber refers here to a subscriber using prepaid subscription, i.e. a subscriber who has paid in advance. The embodiment illustrated in FIG. 1 makes use of Intelligent Network technology. An intelligent network IN is able to provide a subscriber of a telecommunications network, such as a wired network or a mobile telephone network, with a plurality of services. An example of such an intelligent network is described in recommendations of the ITU-T Q-1200 series, of which Q-1210 to Q-1219 define a set of features known as CS-1 (Capability Set 1), and correspondingly, Q-1220 to Q-1229 define a set of features CS-2. The invention and its background will be described by the terminology of recommendation ETS 300 374-1 CoreINAP, but the invention can also be employed in intelligent networks implemented according to other intelligent network standards.

FIG. 1 shows some elements of an intelligent network which are relevant to the understanding of the invention, such as what are known as intelligent peripherals IP. Usually an IP is associated with a specialized resource function which is an interface for network mechanisms associated with interaction with a subscriber. Therefore an IP comprises usually e.g. more advanced speech handling functions than do exchanges in general. The IVR application is usually located in the IP. The IVR application, also called the PrePaid service IVR application, is an interactive voice response application that allows the subscriber to add money to (deposit, recharge) his PrePaid SIM account by entering the number of a prepaid voucher. The IP is connected to an SSP using for example ISUP (ISDN User Part) signalling and one or more voice transports.

The SSP (Service Switching Point) is a network element performing a service switching function (SSF). The SSP may be a mobile service switching centre MSC, which includes the SSF. The SSF is an interface between a conventional call control function CCF and the service control function SCF of an intelligent network. The network element performing the SCF is called a service control point SCP. An intelligent network service is produced by the service switching point SSP inquiring instructions from the service control point SCP by means of messages to be transmitted across the SSP/SCP interface upon the encounter of detection points associated with the service. In association with an intelligent network service, a service program is started at the service control point SCP, the operation of the program determining the messages transmitted by the SCP to the SSP at each stage of a call. However, usually the SCP is not used in the service logic of the Prepaid SIM IVR recharge application, i.e. calls to the IVR are routed by the CCF directly to the IVR on the basis of the service number which the subscriber has dialed in order to recharge.

In the example illustrated in FIG. 1, the prepaid subscriber information and information about vouchers are in a database located in a service management point SMP. Alternatively the information may be located in different databases and/or in some other network element, like a home location register HLR. The IVR interfaces the SMP database through a service management interface SMI. The SMP and the IP may be connected e.g. through a local area network (LAN) using the TCP/IP (Transmission Control Protocol/Internet Protocol). The connection between the IP and the SMP, illustrated by a dashed line, represents only management connection without any signalling connection, e.g. functions used to calculate the expiry time or times during recharge.

In a first preferred embodiment of the invention, predefined profiles are located also in the SMP and each subscriber's subscriber information comprises a profile identifier indicating which profile to use. Thus many subscribers can have the same profile but each subscriber has only one profile in the first preferred embodiment. A prepaid profile is a profile defining at least one of the following attributes: deposit function, expiry function, account maximum, maximum validity period and expiry state handling function. The deposit function defines how the new prepaid credit is calculated. The expiry function defines how the validity of the prepaid credit is calculated based e.g. on current validity, recharge amount, voucher used for recharge, etc. In those embodiments where the prepaid expiry handler has different states for progressively limiting the possibilities of the subscriber over time when no recharge is performed, the expiry state handling function may define for each state when the subscriber is in that state. The expiry state handling function may also define how and where to route calls in different situations, e.g. in different states. The expiry handling function or parts of it may also be included in the expiry function.

The expiry handling function may also be included in the expiry function.

The service management access point SMAP provides some selected users, such as service providers and network operators, with access to the service data of the service management point SMP through a public telephone network, such as the PSTN or the ISDN, a cellular radio network (such as the GSM) or a public data network (X.25, the Internet) and an open interface. The SMAP interacts directly with the SMP. Furthermore, the SMAP can provide access to a network element of another telecommunications network, such as the home location register HLR comprising data related to subscriber information and telecommunications services. Functionally, the SMAP comprises a service management access function. The profiles can be defined and definitions changed via the SMAP. The SMAP is described in greater detail in PCT patent application WO98/41038 which is incorporated herein by reference.

Network operators and service providers are nowadays separated. A service provider buys the necessary bearer services from a network operator. A network operator may also be a service provider. An operator may also have multiple service providers.

FIG. 2 shows an example of different profiles according to the first preferred embodiment of the invention. In the first preferred embodiment of the invention, prepaid services are built with prepaid expiry having different kinds of time limits. In the first preferred embodiment, the prepaid subscriber who has activated his subscription is in one of the five different subscription states, the states being active, near the credit expiry, credit expired, near subscription expiry and subscription expired. The state depends on how long has passed since the subscriber last time recharged. When the credit expires, the credit of a prepaid account is no longer valid. When the subscription expires, the subscription is no longer valid and the subscription is deactivated. The "near states" are states during which an announcement is given indicating what is going to happen soon if the account is not recharged. The prepaid expiry is described in greater detail in Finnish patent application FI990937 which is incorporated herein by reference.

Referring to FIG. 2, a service provider has defined three different profiles: a Gold Profile in which the credit never expires and at each recharge a bonus is given; a Silver profile with a long credit validity and an Economy profile where the prepaid credit must be recharged frequently in order not to lose existing credit.

In the first preferred embodiment of the invention, the service attributes to be defined are a deposit function DF and an expiry function EF. In the first embodiment of the invention, it is assumed for the sake of clarity that the same basic function is used in every profile. However, it is possible to define different functions for different profiles. In the first preferred embodiment of the invention, the deposit function is:

new credit=$X_n$*old credit+(1+bonus)*voucher value where Xn relates to what state the subscriber is in, e.g. X1 is used when the subscriber is in the active state, X2 when the state is "near credit expiry", X3 in state "credit expired", X4 "near subscription expiry" and X5 in state "Subscription expired".

In the first preferred embodiment a max acc, i.e. maximum account credit, is also used. Thus, if a recharge results in a credit greater than the maximum account credit, the recharge is not accepted and the voucher remains unused. In some other embodiments of the invention when the new credit exceeds the max acc, the new credit may also be set for example to the maximum value.

In the first preferred embodiment of the invention, the expiry function calculates the dates as follows:

credit expiry date=$A$+credit period of a voucher+$T3$ where A defines whether to use the current date or the old credit expiry date, T3 allows adjusting length period before the credit expires. For example in the gold profile illustrated in FIG. 2, the credit will expire when the subscription expires.

The other dates are calculated on the basis of credit expiry date in the first preferred embodiment by formula:

date=credit expiry date+$DT_n$ where DTn relates to time differences between credit expiry date and other dates. DT2 is used to calculate the date when the state "near credit expiry" is entered, DT4 relates to the state "near subscription expiry" and DT5 "subscription expiry".

In the first preferred embodiment of the invention, a max time, i.e. a maximum validity period, is also used. If a recharge results in the number of days between recharge day and the credit expiry date exceeding the maximum validity period, then the new credit expiry date will be set to the current date plus the maximum validity period.

The maximum account credit and the maximum validity period values may be set into the profile definitions as in FIG. 2 or the profile definitions may indicate that such attributes are used and the actual values are in the subscriber specific information.

The functions described above in FIG. 2 are only examples and meant to illustrate the invention. The service provider may compose different kinds of functions using different kinds of variables, constants, voucher properties, etc.

Figure 3:
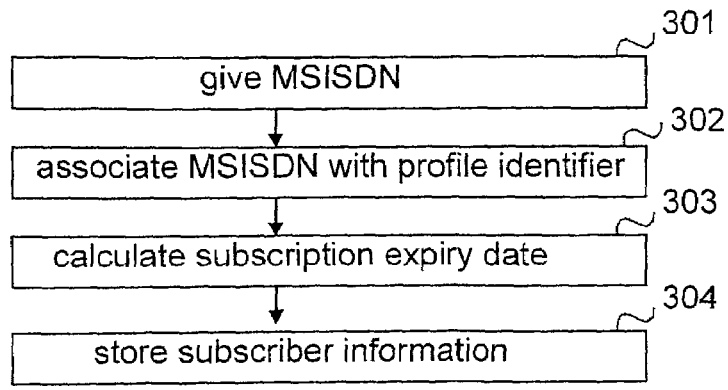
FIG. 3 is a flow chart illustrating subscriber provisioning.

FIG. 3 is a flow chart illustrating subscriber provisioning in the first preferred embodiment of the invention. In step 301a subscriber number MSISDN is given to a subscriber, and in step 302 a profile is associated with the MSISDN in the subscriber information. The profile is identified with an identifier which can for example be a name like Gold, Silver and Economy in the example illustrated in FIG. 2. After that, in the first preferred embodiment of the invention, a subscription expiry date is calculated in step 303 using, the value of DT5 of FIG. 2 defined in the profile. Then the subscriber information (including the MSISDN, the profile identifier and the subscription expiry date) is stored in step 304 in the SMP and the subscriber can activate his subscription by a recharge.

Figure 4:
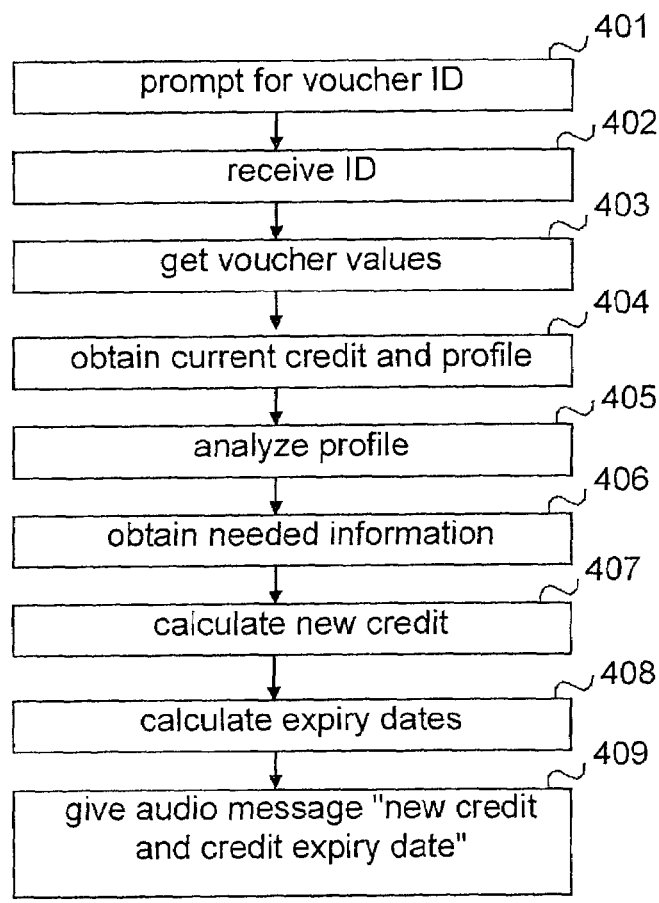
FIG. 4 is a flow chart illustrating the functionality of the invention during recharge.

FIG. 4 is a flow chart illustrating a recharge in the first preferred embodiment of the invention. It is assumed, for the sake of clarity, that the new voucher is valid, all necessary information will be obtained and the calling subscriber is a prepaid subscriber, otherwise he cannot recharge. Another assumption, made here, is that the subscriber recharges via the IVR yet without limiting the invention to that particular way to recharge. The invention may be used with other recharge media as well.

Referring to FIG. 4, a subscriber has bought a voucher from a shop, called the IVR and selected to deposit the voucher. It is assumed that the IVR checks at the beginning of the call, if the caller is a prepaid subscriber, and if not, then the call is disconnected or connected to customer service. FIG. 4 begins in step 401, where the IVR is prompting the subscriber for a voucher identification ID. The voucher identification number ID is received in step 402. The validity of the voucher is checked (not shown in FIG. 4) and after that, in step 403, the IVR obtains the values of the voucher, e.g. the value to deposit and the credit period used by the deposit function DF and the expiry function EF described in greater detail in FIG. 2. The IVR then obtains the subscriber's current credit and profile in step 404. Then the IVR analyzes the profile in step 405 in order to find out what information it needs to update subscriber information. In the first preferred information the necessary information is the current state so that the right value for Xn can be selected. In step 406 the IVR obtains the necessary information and then the new credit is calculated in step 407 with the deposit function values indicated in the profile. After that the expiry dates are calculated in step 408 with expiry function values indicated in the profile. The updating is then ready and the subscriber is given, in step 409, an audio message telling the new credit and the credit expiry date.

The steps have not been set out in an absolute time sequence in FIGS. 3 and 4. Some of the above steps may take place simultaneously or in a different order, for example. Some steps may also be skipped, like steps 303 and 408 in embodiments where the expiry is not used. Other steps not shown in FIGS. 3 and 4 may also take place between the steps stated above.

In some other embodiments a default profile may be used. It is automatically associated during provisioning with the subscriber information if no other profile is indicated, or the attributes of the default profile are used during recharge in cases when the subscriber has no profile associated directly with the subscriber information.

It is also possible to add the values of attributes, i.e. profile definitions, to the subscriber information during subscriber provisioning and this way associate the subscriber information with a profile. In these embodiments the subscriber information does not comprise a profile identifier but a whole profile definitions with values for attributes. However, separate profile definitions are more preferable, since they a less laborious and less susceptible to errors. A further advantage of using separate profile definitions instead of adding profile definitions to each subscriber's subscriber information is that a lot less memory is needed and changing profile definitions is much easier.

The present invention can be implemented in the existing network elements. They all have processors and a memory with which the inventive functionality described above may be implemented. The functions described above may be located in one network element or some of them may be in one element and the others in other elements regardless of how they are located in the examples used to illustrate the invention.

The accompanying drawings and the description pertaining to them are only intended to illustrate the present invention. Different variations and modifications to the invention will be apparent to those skilled in the art, without departing from the scope and spirit of the invention defined in the appended claims.

The invention claimed is:

1. A network element comprising:
a processor configured to have access to at least two different prepaid profile definitions, each prepaid profile comprising at least one attribute for the prepaid service,
the attribute defining how prepaid service information relating to the attribute is to be updated during a recharge,
a first way defined in a first prepaid profile providing different updated information than a second way defined in a second prepaid profile with the same given values, and to have access to subscriber information on prepaid subscribers,
a prepaid subscriber's subscriber information comprising prepaid service information and an indication of which one of the at least two different prepaid profiles is to be used with this subscriber, and to update, during a prepaid subscriber's account recharge,
the prepaid service information in the prepaid subscriber's subscriber information as defined by the attribute in the prepaid profile indicated by the prepaid subscriber's subscriber information, the attribute not being selectable by means of recharge.

2. A network element comprising:
means for obtaining voucher information on a voucher in response to a prepaid subscriber recharging via the voucher;
means for obtaining at least two different non-subscriber-specific prepaid profile definitions, each prepaid profile comprising at least one attribute for the prepaid service, the attribute indicating how the prepaid service information relating to the attribute is to be updated with the voucher information during a recharge, a first way defined in a first prepaid profile providing different updated information than a second way defined in a second prepaid profile with the same given values;

means for obtaining subscriber information on prepaid subscribers, a prepaid subscriber's subscriber information comprising prepaid service information and an indication of which one of the at least two different prepaid profiles is to be used; and means for updating the subscriber information during the recharge according to a prepaid profile associated with the recharging prepaid subscriber's subscriber information.

3. A method comprising:

maintaining subscriber information on at least one prepaid subscriber using a prepaid subscription, maintaining voucher information on vouchers by means of which prepaid subscribers can recharge their accounts, maintaining at least two different prepaid profile definitions to be used with prepaid subscriptions, each prepaid profile comprising at least one attribute for the prepaid service, one of the at least one attribute being an expiry function defining how to calculate the validity time of the prepaid credit, a first prepaid profile comprising a first way to calculate the validity time and a second prepaid profile comprising a second way to calculate the validity time, the second way being different from the first way;

associating the prepaid subscriber's subscriber information with only one prepaid profile, obtaining, in response to a prepaid subscriber performing a recharge of the prepaid subscriber's account via a voucher, values of the voucher, the values including a credit period of the voucher, calculating, in response to the recharge, the prepaid subscriber's credit validity time according to the expiry function defined in the prepaid profile associated with the prepaid subscriber's subscriber information, the expiry function using the obtained credit period of the voucher as an input.

4. A network element comprising a processor configured to:

have access to values of vouchers, the vouchers being usable for recharging prepaid accounts, the values including for each voucher a credit period of the voucher;

have access to at least two different prepaid profile definitions, each prepaid profile comprising at least an expiry function as an attribute for the prepaid service, the expiry function defining how to calculate a validity time of the prepaid credit during a recharge, a first way defined in a first prepaid profile providing different updated validity time than a second way defined in a second prepaid profile with the same given input;

have access to subscriber information on prepaid subscribers, a prepaid subscriber's subscriber information comprising prepaid service information including credit validity time and an indication of which one of the at least two different prepaid profiles is to be used with this subscriber;

in response to a prepaid subscriber performing a recharge of the prepaid subscriber's account via a voucher, to obtain values of the voucher including a credit period of the voucher; and to calculate the prepaid subscriber's updated credit validity time according to the expiry function defined in the prepaid profile indicated in the prepaid subscriber's subscriber information, the expiry function using the obtained credit period of the voucher as an input.

5. A method, comprising:

maintaining at least two different prepaid profiles definitions, each prepaid profile comprising for the prepaid service at least one attribute defining how prepaid service information relating to the attribute is to be updated during recharge, a first way defined in a first prepaid profile providing different updated information than a second way defined in a second prepaid profile with the same given values;

maintaining subscriber information on a prepaid subscriber, the prepaid subscriber's subscriber information comprising prepaid service information and an indication of which only one of the at least two different prepaid profiles is to be used with this subscriber; and updating, in response to the prepaid subscriber recharging the prepaid subscriber's account, the prepaid service information in the prepaid subscriber's subscriber information as defined by the attribute in the prepaid profile indicated by the prepaid subscriber's subscriber information.

6. The method of claim 5, further comprising associating the prepaid subscriber's subscriber information with one of the at least two different prepaid profiles during subscription provisioning.

7. The method of claim 5, further comprising updating subscriber information during recharge as defined in the prepaid profile.

8. The method of claim 5, wherein the attribute comprises deposit function defining how to calculate the credit during recharge from the amount added.

9. The method of claim 5, wherein the attribute comprises an expiry function defining how to calculate the validity time of the prepaid credit.

10. The method of claim 5, wherein the attribute comprises an expiry state handling function defining how the possibilities of a prepaid subscriber are limited over time when no recharge is carried out.

11. The method of claim 5, further comprising predefining the at least two different prepaid profiles in the telecommunication system before said at least one prepaid subscriber accesses the telecommunication system.

12. A telecommunications system, comprising:

at least one database having subscriber information on at least one prepaid subscriber, a prepaid subscriber's subscriber information comprising subscriber-specifically maintained prepaid service information, wherein the system is arranged to maintain at least two different prepaid profiles, each prepaid profile comprising at least one attribute for the prepaid service, the at least one attribute defining how prepaid service information relating to the attribute is to be updated during recharge, a first way defined in a first prepaid profile providing different updated information than a second way defined in a second prepaid profile with the same given values;

wherein the system is arranged to indicate, in the prepaid subscriber's subscriber information, which only one of the at least two different prepaid profiles is to be used; and to update, in response to the prepaid subscriber recharging the prepaid subscriber's account, the prepaid subscriber's prepaid service information as indicated by the attribute defined in the prepaid profile indicated by the prepaid subscriber's subscriber information.

13. The system of claim 12, wherein the at least one attribute comprises a deposit function and the system is further arranged to calculate a prepaid subscriber's credit according to the deposit function defined in the one prepaid profile associated with the prepaid subscriber's subscriber information.

14. The system of claim 12, wherein the attribute comprises an expiry function and the system is further arranged to calculate a prepaid subscriber's credit validity according to the expiry function defined in the one prepaid profile associated with the prepaid subscriber's subscriber information.

15. The system of claim 12, wherein the attribute comprises an expiry handling function and the system is further arranged to limit the possibilities of a prepaid subscriber over time according to the expiry handling function defined in the one prepaid profile associated with the prepaid subscriber's subscriber information.

16. A network element comprising:
a database containing at least two different prepaid profile definitions, each prepaid profile comprising, for the prepaid service, at least one attribute definition defining how subscriber-specifically maintained prepaid service information relating to the attribute is to be updated in a corresponding subscriber information during recharge of a subscriber account;

a first way defined in a first prepaid profile providing different updated information than a second way defined in a second prepaid profile with the same given values, the prepaid profile definitions not being definitions for means of recharge.

17. The network element of claim 13, wherein the attribute comprises a deposit function defining how to calculate the credit during recharge.

18. The network element of claim 13, wherein the attribute comprises an expiry function defining how to calculate the validity time of the prepaid credit.

19. The network element of claim 13, wherein the attribute comprises an expiry state handling function defining how the possibilities of a prepaid subscriber are limited over time when no recharge is carried out.

* * * * *